United States Patent

Chabrolle

[11] 4,345,820
[45] Aug. 24, 1982

[54] VISUAL DISPLAY APPARATUS FOR ELECTRICAL SIGNALS RECORDED ON A MAGNETIC MEDIUM

[75] Inventor: Jacques Chabrolle, Bagnolet, France

[73] Assignee: "L.C.C.-C.I.C.E. Compagnie Europeenne de Composants Electroniques", Bagnolet, France

[21] Appl. No.: 148,835

[22] Filed: May 12, 1980

[30] Foreign Application Priority Data

May 10, 1979 [FR] France ................... 79 11854

[51] Int. Cl.³ .............................................. G02F 1/01
[52] U.S. Cl. ................................................... 350/362
[58] Field of Search ...................................... 350/362

[56] References Cited

FOREIGN PATENT DOCUMENTS 927350 6/1963 United Kingdom .

Primary Examiner—William L. Sikes
Assistant Examiner—Leon Scott, Jr.
Attorney, Agent, or Firm—Oblon, Fisher, Spivak, McClelland & Maier

[57] ABSTRACT

The apparatus for the visual display of electrical signals recorded on a magnetic medium or support is in the form of a "magnifying glass" which is a plate or sheet of transparent material in which there is a dimple closed by a membrane. The volume of the dimple is filled by a mild ferrite dispersion in a liquid. Under the action of the magnetic field, the ferrite particles are displaced and give an image of the magnetic state of the media.

7 Claims, 4 Drawing Figures

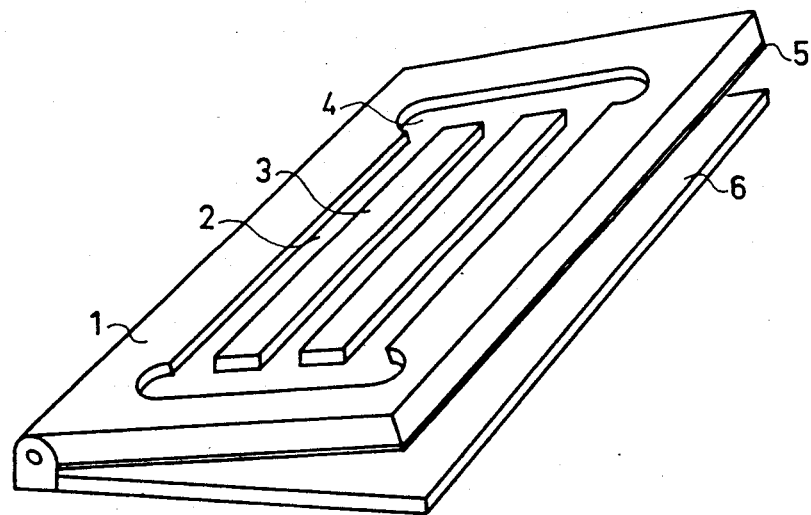
FIG. 1
PRIOR ART
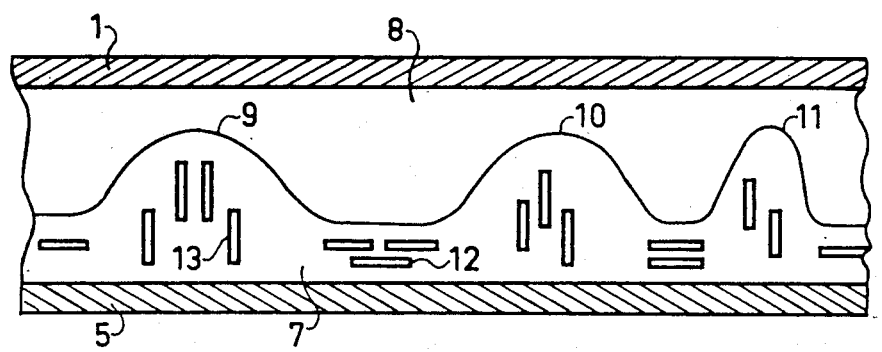
PRIOR ART FIG. 2

VISUAL DISPLAY APPARATUS FOR ELECTRICAL SIGNALS RECORDED ON A MAGNETIC MEDIUM

BACKGROUND OF THE INVENTION

The invention relates to means for the visual display and storage of data recorded on a magnetic medium, such as a magnetic card or tape. It more specifically relates to a device of the "magnifying glass" type placed on the recorded medium and which reveals the magnetic information by the displacement of a pulverulent solid.

Magnetic recording is an extremely convenient way to process or store data and is at present widely used. It is possible to manipulate or convert into magnetic signals all types of information, no matter whether they are analog, e.g. television pictures, music, manufacturing variables in an industrial process or digital, e.g. particularly in information processing. The interest in converting data into magnetic signals is increased by the varied and economic advantages of recording media, whose scope ranges from the magnetic computer memory or the tape storage of television pictures to a simple identification track on a card, badge or ticket. However, all these media or supports, or more specifically the magnetic recording, suffer from one important disadvantage compared with other storage means and that is that the content is not visible to the human eye. To identify the content of a recording or read the message or join two recorded elements, it is necessary to use relatively complex means when compared with the simplicity of the recording. Examples of such means are the tape recorder for music, the visual tape recorder for pictures or the display unit for digital signals, without this list being in any way complete.

BRIEF SUMMARY OF THE INVENTION

The invention relates to a simple means making it possible to see magnetic data on their support, whilst retaining the image or picture after the "magnifying glass" has been removed from the recording medium. In order to make the text and the relevant explanation simpler, the term "magnifying glass" is used hereinafter to designate the magnetic data visual display means according to the invention.

Thus, the invention relates to an apparatus for the visual display of electrical signals recorded on a magnetic medium comprising a rigid block of non-magnetic transparent material in which there is a dimple containing a developing film sensitive to the magnetic field of the recording medium or support placed against the membrane which closes the dimple, wherein the developing film is constituted by a suspension of a highly ferromagnetic, mild ferrite in a liquid, the ferrite particles being displaced under the action of the magnetic field.

BRIEF DESCRIPTION OF THE DRAWINGS

The invention is described in greater detail hereinafter relative to non-limitative embodiments and with reference to the drawings, wherein show:

FIG. 1 a prior art visual display apparatus.

FIG. 2 a sectional view through the sensitive layer of the prior art apparatus.

DETAILED DESCRIPTION OF THE PREFERRED EMBODIMENTS

Figure 3:
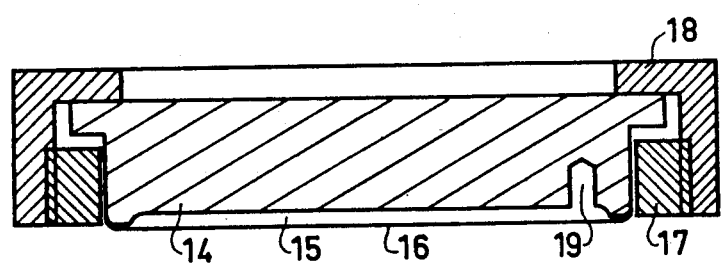
FIG. 3 a sectional view through the apparatus according to the invention.

FIG. 1 shows a magnetic data visual display means as described in French Pat. No. 1,238,490.

A transparent organic or mineral glass plate 1 contains a cavity 2, whose depth is less than the thickness of plate 1. This cavity is also divided up into strips by members 3 and has reserves 4. However, the same effect is obtained if the cavity has neither strips nor reserves and is, for example, circular. A glass plate 5 is held, e.g. by gluing against plate 1 by forming the cavity 2, it being stated that the cavity is not as deep as plate 1 is thick. Another hinged plate 6 constitutes a pressure means for the magnetic medium to be read against the apparatus.

Using appropriate means, cavity 2 is filled with a liquid suspension consisting of fine particles of alpha iron oxide $Fe_2O_3$ kept in suspension by a small amount of wetting agent.

FIG. 2 is a sectional view through the sensitive layer during the reading of a recording.

Between glass plates 1 and 5 there is a suspension of particles 7 in water 8, the particles settling rapidly when stirring is stopped. The magnetic medium placed against the lower plate 5 contains, for example, three magnetic signals located in zones 9, 10 and 11.

In conventional manner, the alpha iron oxide $Fe_2O_3$ crystals are indicated by small rods 12 and 13. In actual fact, they are visible flat crystals, i.e. they are coloured red and not transparent, and are slightly ferromagnetic. In suspension, they orient and align themselves in the magnetic field and thus have a clearly differentiated degree of reflection of the incident light. Thus, the crystals such as 12 in a zone where there is no magnetic field are deposited on plate 5, whilst crystals such as 13 in the magnetic field of a recorded signal are oriented in accordance with the field lines. The crystals do not move and instead are oriented in situ.

However, this visual display means has serious disadvantages. Its reading is difficult because the iron oxide coating has no discontinuities. During their orientation, the crystals form irregularities on the surface of the pulverulent layer in such a way that readings carried out more easily by the shadow carried by undulations 9, 10 and 11 on the surface, than by the change in reflection of the light in the same zone. In addition, there is no movement of the crystals and instead they change position. As soon as the apparatus is removed from the magnetic medium, the visual display is erased, so that there is no storage action.

The visual display apparatus according to the invention is easy to read and stores the magnetic data read.

FIG. 3 is a section through the magnifying glass according to the invention, which is preferably but not necessarily circular and its shape can be matched to that of the magnetic media to be read.

From the construction standpoint, the magnifying glass comprises a block 14 made from a transparent rigid material, such as organic or mineral glass, in which there is a relatively shallow dimple 15, closed by a membrane 16 made from an organic synthetic product, which is therefore non-magnetic. Ancillary members 17 and 18 are responsible for the magnetic sealing of the assembly. Member 17 stretches and secures membrane 16, whilst member 18 presses block 14 against member 17 for sealing the apparatus. In addition, a cavity 19 is made on the edge of the blister in block 14. Its depth is less than the thickness of block 14 and it constitutes both a liquid store and a trap for air bubbles which could be left behind in the apparatus as will be explained hereinafter.

In the preferred constructions of the magnifying glass, the depth of dimple 15 is of the order of a few hundred millimeters and the thickness of membrane 16 is between 5 and 100 microns, depending on the material used.

The face of membrane 16 within the magnifying glass is advantageously metallized. The metal coating, which is too fine to form an obstacle to the magnetic field of the recorded signals, serves as a mirror, which considerably improves the quality of the image obtained.

The magnifying glass is deposited on the recording medium in the form of a magnetic card or tape which bears against membrane 16. The recorded signals are removed from the sensitive layer only by the thickness of the membrane, i.e. 5 to 100 microns.

The volume of dimple 15, closed by a tight membrane is filled by a suspension of pulverulent solids in water, to which has been added surfactants and whose function is to maintain in suspension powder particles wetted by the water, thus preventing foam formation. This suspension forms the sensitive coating.

The suspended solid is a highly ferromagnetic, mild ferrite compared with alpha iron oxide $Fe_2O_3$, which is a material with limited ferromagnetic characteristics. Excellent results are obtained with a ferrite containing oxides of manganese and zinc in the case of a grain size distribution between a few hundredths of a micron (0.02) and a few microns (10).

The grain size distribution of the mild ferrite and the proportions of the ferrite, water and surfactants vary in accordance with the envisaged applications, i.e. according to the high or low recording density for wavelengths between 5 and 500 microns.

Figure 4:
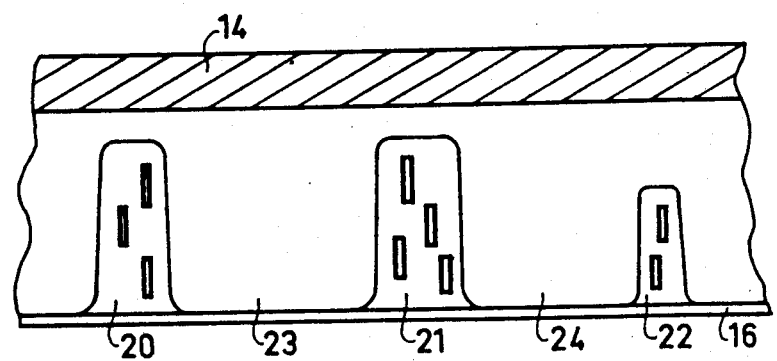
FIG. 4 a sectional view through the sensitive layer according to the invention.

FIG. 4 is a sectional view of an image fragment obtained with the apparatus according to the invention. The relative scales are conventionally adapted so that the drawing can be more easily understood. The sensitive coating is between the transparent block 14 and the metallized membrane 16. When the magnifying glass is placed on a recorded magnetic medium the magnetic field of the signals displaces the ferrite particles, which migrate and form (bars) such as 20, 21 and 22. Bars are shown in FIG. 4 and correspond to digital signals. If the recorded signals are analog, the accumulations of particles 20, 21 and 22 have less abrupt sides, but nevertheless the regions such as 23 and 24 between the accumulations of particles are free from any particles because they have migrated, which improves the image quality obtained.

As the ferrite suspension is dark grey in colour, the image of a digital recording is made clearly visible by an alternation of almost black strips representing the ferrite particles separated by metallic strips corresponding to the ferrite particle-free regions of the metallized membrane. The image quality is further improved by colouring the suspension as a function of the recording density to be read by means of a substance such as fluorescein.

In addition to its sharpness and contrast qualities, the image of a magnetic recording given by the magnifying glass is stable, which enables it to be stored. As the ferrite particles are displaced in accordance with magnetic polarities and pass from a first stable position to another stable position, it is possible to remove the magnifying glass from the recording medium on which it was placed. Provided that there are no external vibrations or impacts, the image remains making it possible either to photograph it because it has a clear black on white contrast which is much sharper than in the prior art, or to analyse it in a quantitative manner by means of optical equipment such as magnifying glasses, binoculars, microscopes, photodensitometers, etc or to compare it with reference recordings.

The image is erased for reusing the magnifying glass by re-suspending the ferrite particles either by passing a finger over the membrane which has a certain flexibility, or by breaking the organisation of the ferrite particles by means of a small magnet.

One of the most effective mild ferrites has a ternary composition with 50 to 60% (in moles) of iron oxide ($Fe_2O_3$), 20 to 40% of manganese oxide (MnO) and 10 to 30% of zinc oxide (ZnO).

The ferrite used can be prepared by a conventional process in which, following an initial dry mixing, the oxides are ground in a wet ambient in ball mills. The slips or slops recovered are dried and then granulated. Prefritting is carried out in a rotary kiln at about 1000° C. During this operation, there is an initial ferrite formation.

The then heterogeneous granular material recovered after this heat treatment is then ground again, prior to atomization and fritting. A final grinding operation makes it possible to obtain a powder with the desired grain size for the intended use in the magnetic magnifying glass.

However, new processes can advantageously be used in the special case of the present utilization. These consist, for example, of coprecipitations of hydroxides, joint roasting of salts, vacuum sublimation or lyophilisation, etc.

These processes have the advantages of a very precise and homogeneous chemical composition, a better reactivity with very fine and much more homogeneous particles and fritting at a lower temperature.

The liquid suspension forming the developing film contains 1 to 4% by volume of wetting agent and 1 to 8% of dispersing agent. The ferrite proportion varies according to the intended use of the magnifying glass and in conventional optics this would be expressed by the term magnification of the magnifying glass. For a powder grain size between (0.02) and 10 microns the suspension contains 5 to 15 mg of dry powder in 500 mg of liquid if the density of the electrical signals on the magnetic medium is between 10 and 75 bpi (bits per inch). For the same grain size, but for information densities between 75 and 150 bpi or between 150 and 300 bpi the powder quantity is respectively 2 to 10 mg and 1 to 4 mg.

What is claimed is:

1. An easily erasable visual memory apparatus for visual display of signals recorded on a magnetic medium comprising:
   a rigid block of non-magnetic transparent material;
   a dimple formed in said rigid block and containing a liquid suspension;
   a supple membrane closing said dimple;
   said liquid suspension comprising magnetic particles susceptible to being displaced by the fields of each magnetic signal of said magnetic medium, said magnetic medium being placed against said supple member to form said visual display and wherein said supple member is adapted to erase said display when a finger is passed over said membrane.

2. An apparatus according to claim 1 wherein said supple member is made of organic polymer having a thickness between 5 and 100 microns.

3. An apparatus according to claim 1 wherein said supple membrane is metallized on its face within the dimple.

4. An easily erasable visual memory apparatus for visual display of signals recorded on a magnetic medium comprising:
 a rigid block of non-magnetic transparent material;
 a dimple formed in said rigid block and containing a liquid suspension;
 a membrane closing said dimple;
 said liquid suspension comprising mild ferrite particles that are susceptible to being displaced by the fields of each magnetic signal of said magnetic medium, said magnetic medium being placed against said membrane and whereby said particles do not form permanent magnets which would cause the particle to remain tightly bound together when said magnetic medium is removed.

5. An apparatus according to claim 4 wherein the mild ferrite contains in moles 50-60% of iron dioxide ($Fe_2O_3$), 20-40% of manganese oxide (Mn O) and 10-30% of zinc oxide (Zn O).

6. An apparatus according to claim 5 wherein the ferrite particles have a grain size distribution between 0.02 and 10 microns.

7. An apparatus according to any one of claims 1 to 4, wherein said dimple comprises a bubble trap cavity.

* * * * *